(12) United States Patent
Raffuzzi et al.

(10) Patent No.: US 10,876,392 B2
(45) Date of Patent: Dec. 29, 2020

(54) MEASURING DEVICE OF AN EXCAVATION SITE

(71) Applicant: SOILMEC S.p.A., Cesena (IT)

(72) Inventors: Mirco Armando Raffuzzi, Cervia (IT); Pietro Fontana, Cesena (IT); Ivano Guerra, Cesena (IT)

(73) Assignee: SOILMEC S.P.A., Cesena (IT)

( * ) Notice: Subject to any disclaimer, the term of this patent is extended or adjusted under 35 U.S.C. 154(b) by 552 days.

(21) Appl. No.: 15/905,901

(22) Filed: Feb. 27, 2018

(65) Prior Publication Data
US 2018/0245449 A1 Aug. 30, 2018

(30) Foreign Application Priority Data

Feb. 28, 2017 (IT) .................. 102017000022210

(51) Int. Cl.
| | | |
|---|---|---|
| *G01F 17/00* | (2006.01) | |
| *E21B 47/003* | (2012.01) | |
| *E02F 3/20* | (2006.01) | |
| *G01B 5/207* | (2006.01) | |
| *G01B 3/46* | (2006.01) | |
| *G01C 7/06* | (2006.01) | |
| *E02F 3/26* | (2006.01) | |
| *G01B 5/20* | (2006.01) | |
| *E02D 17/13* | (2006.01) | |

(52) U.S. Cl.
CPC ............ *E21B 47/003* (2020.05); *E02F 3/205* (2013.01); *E02F 3/26* (2013.01); *G01B 3/46* (2013.01); *G01B 5/20* (2013.01); *G01B 5/207* (2013.01); *G01C 7/06* (2013.01); *G01F 17/00* (2013.01); *E02D 17/13* (2013.01)

(58) Field of Classification Search
CPC .......... E21B 47/003; E02F 3/26; E02F 3/205; G01C 7/06; G01B 3/46; G01B 5/207; G01B 5/20; G01F 17/00; E02D 17/13
See application file for complete search history.

(56) References Cited

U.S. PATENT DOCUMENTS

2010/0307825 A1* 12/2010 Siepi .................. E02F 3/26
175/45

FOREIGN PATENT DOCUMENTS

| EP | 2273067 A1 | 1/2011 |
| JP | H0469704 U | 6/1992 |

OTHER PUBLICATIONS

Italian Search Report for Italian Application No. IT 201700022210. (2 Pages) dated (Dec. 13, 2017).

* cited by examiner

*Primary Examiner* — Xin Y Zhong
(74) *Attorney, Agent, or Firm* — Lucas & Mercanti, LLP

(57) ABSTRACT

A measuring device for measuring an excavation site is described having a supporting frame, at least one profile measuring apparatus, associated with the supporting frame, facing a corresponding lateral wall of the excavation site. Each profile measuring apparatus has a feeler element arranged to remain in contact with the excavation site lateral wall. A sensor system associated with the supporting frame is provided having rotation sensors, and translation sensors. A data processing system, based on the rotation and translation data measured by the sensor system, is provided for calculating the actual profile of the lateral wall of the excavation site.

20 Claims, 6 Drawing Sheets

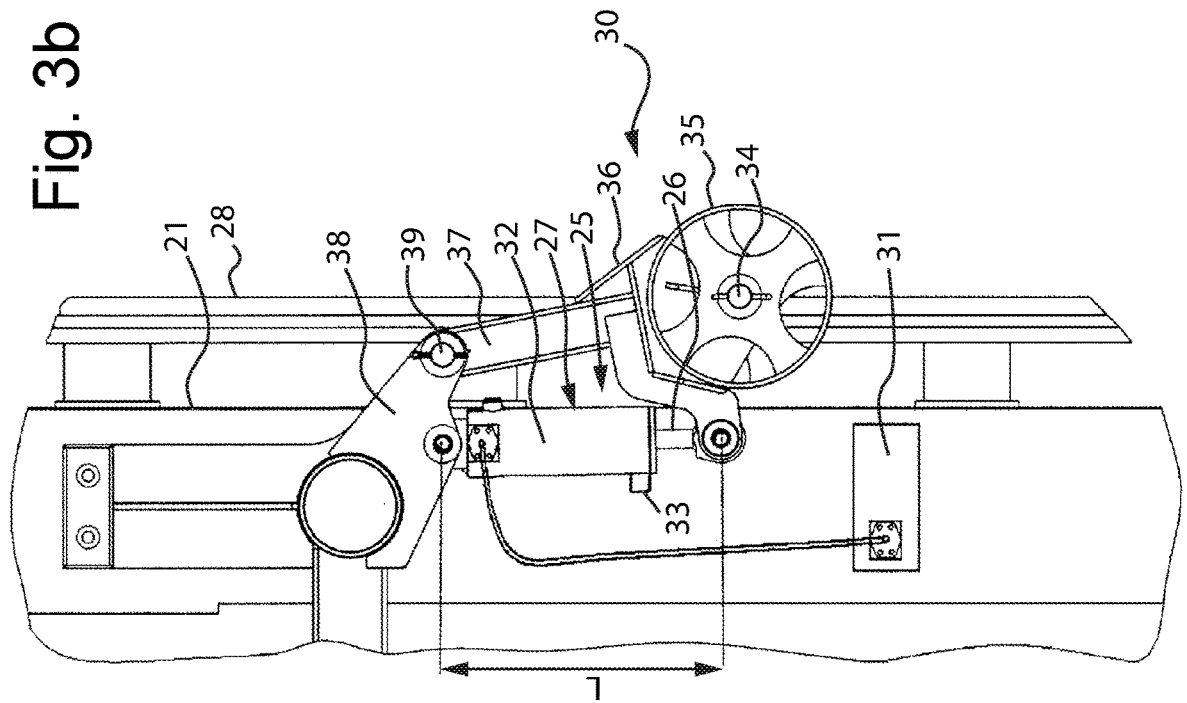
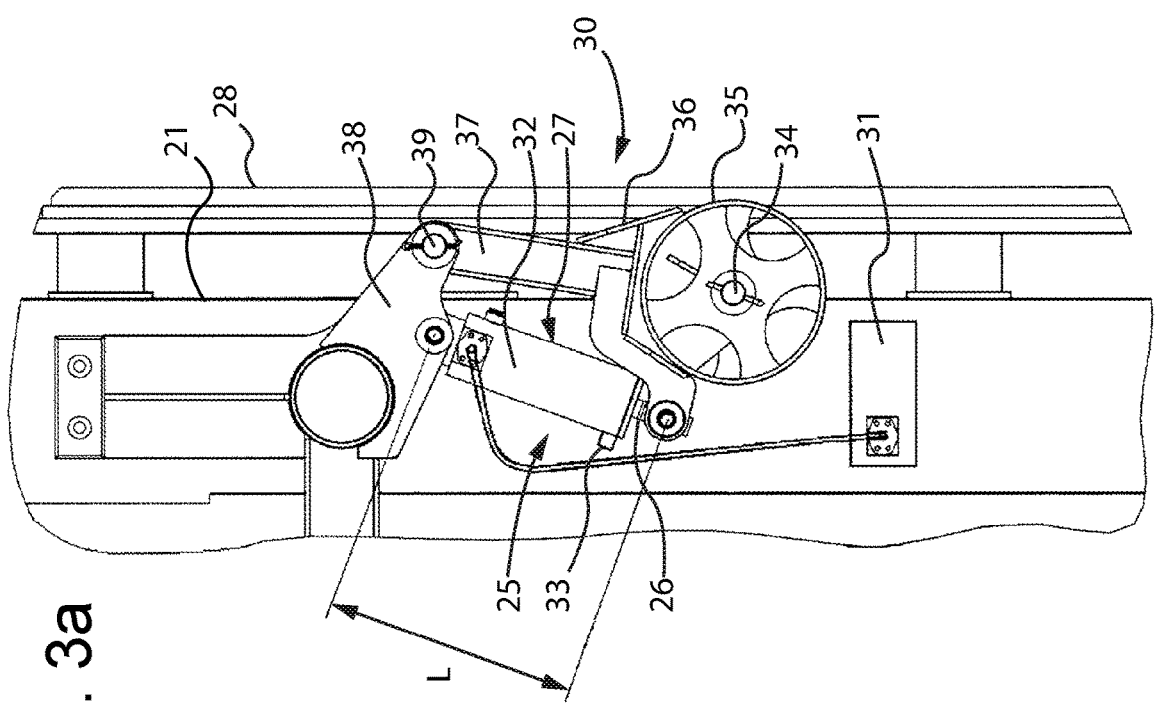

MEASURING DEVICE OF AN EXCAVATION SITE

CROSS-REFERENCE TO RELATED APPLICATION

This application claims the benefit of Italian Patent Application No. 102017000022210 filed Feb. 28, 2017, the contents of which are incorporated herein by reference.

FIELD OF THE INVENTION

The present invention refers to a measuring device of an excavation site carried out with an excavation machine, as well as to a method for measuring the deviations and the profile of such an excavation site of a panel or of a diaphragm.

BACKGROUND OF THE INVENTION

In the field of foundations excavation machines are known that are equipped with respective excavation devices, like for example mills, cutters or buckets. These excavation machines can, in particular, be drilling machines, in other words arranged to make circular holes, or machines arranged to make deep excavations having approximately rectangular design sections of great depth to make single panels or diaphragm walls consisting of a plurality of adjacent panels. Irrespective of the type of excavation machine, the respective excavation devices are usually hung on suspension elements. These suspension elements can be both of the rigid type, like for example shafts or beams, and of the flexible type, like for example cables.

The aforementioned panels or diaphragm walls can have a function of containing the floor, or of hydraulic sealing, or even a foundation function. Once the excavation has finished, the panel is made by casting cement or hardening material inside the excavation site, and possibly inserting armor elements, so as to obtain, after hardening, a solid body that follows the actual three-dimensional shape of the excavation site made. The casting of the cement is carried out through pressurised hoses that are lowered to the bottom of the excavation site and progressively lifted following the level of the cement in the excavation site.

Given the remarkable volume of the excavation site, in order to allow it to be completely filled it is necessary to bring multiple truck mixers to the work site which supply the necessary cement at predetermined time intervals, so that the filling of the excavation site can be carried out with continuity in order to ensure uniform hardening of the cement. The precision in determining the actual volume of the excavation made has a decisive impact on the planning of the casting step, since based on such a determination the amount of cement necessary to completely fill the excavation site during casting is calculated and the number of truck mixers necessary and the arrival times at the work site of such truck mixers are planned.

In the case in which the determination of the actual volume of the excavation is wrong and the planned number of truck mixers is insufficient to completely fill the excavation, further unplanned truck mixers would have to be recalled. This could involve time delays not compatible with the maximum permitted time periods between one casting and the next to ensure uniform hardening of the cement and therefore a high quality of the panel made. In the case in which the determination of the actual volume of the excavation is wrong and the planned number of truck mixers is greater than what is really necessary, there would be an increase in the costs due both to hiring unnecessary truck mixers, and to the waste of excess cement.

In order for the diaphragm wall to perform an effective hydraulic sealing function it is essential to ensure the perfect continuity between the excavated panels. In other words, it is necessary to ensure the correct interpenetration between the adjacent panels along the entire excavation depth, thus obtaining hydraulically-sealed joints between every panel and the adjacent ones. During the excavation step, or during the rising step of the excavation device, it is possible that localised collapsing of the walls of the excavation site occur, also called "cave-ins", which can generate criticalities in the casting step. Indeed, cave-ins, which can also be of remarkable size, result in an increase in the size of the actual section of the excavation made in the collapsing area with respect to the design section. In addition to this, the actual section of the excavation can be greater than the design section also due to the fact that, given the great depth, it is often necessary to make the excavation of the panel in many excavation steps carried out in different days.

In order to be able to carry out more excavation steps, the excavation device must be repeatedly lowered and raised from the bottom of the excavation. During such strokes, the excavation device carries out an upsetting of the walls increasing the dimensions of the actual sections of the excavation. Such increases in section cause a remarkable increase in the amount of cement necessary during the casting step with respect to the amount of cement calculated based on the theoretical volume of the excavation, determined through the design section and the design depth of the panel.

In order to ensure the correct interpenetration between the adjacent panels it is essential to make the excavation in an extremely precise manner, as will be specified better hereinafter. For every panel in the design step a theoretical design axis is defined, which in general is substantially vertical and passes through the centre of symmetry of the design section. For every panel it is indeed possible to define, from the excavation step, an actual axis of the excavation passing through the centre of symmetry or, in general, through the barycentre of the actual sections of the excavation along the entire excavation depth.

If the actual axes of the excavations of the adjacent panels deviate considerably from one another, or such actual axes deviate remarkably from the corresponding theoretical design axis, there could be a reduction in the thickness of interpenetration of the adjacent panels. In particular, if the deviations of two adjacent panels are equal in absolute value with respect to the theoretical axis, but take place in the opposite direction, the effect of the deviations would add together in the joining area. In any case, a joint would be obtained with hydraulic seal and efficiency lower than what is required by the design. In the worst-case scenario, it is possible to create, between the adjacent panels, openings or spaces such as to totally nullify the hydraulic sealing function required at the diaphragm wall.

In order to ensure a correct function of containment of the ground or of hydraulic sealing it is essential to be able to measure the deviations of the actual axis of the excavation with respect to the theoretical design axis before carrying out the casting of the cement. If the measurement of such deviations is carried out only after the excavation step, it would be necessary to carry out the excavation of the adjacent panel taking such measured deviations into consideration. If, on the other hand, the measurement of such deviations is carried out during the excavation step of the panel and the excavation device is provided with actuators capable of correcting the advancing direction of the device itself, it would be possible to control and correct the advancing direction to compensate for such measured deviations.

In order to precisely identify the actual volume of the excavation made and, thus, calculate the amount of cement necessary to completely fill the excavation during casting, it is essential to measure or at least determine, along the entire excavation depth, the actual area and the actual shape of the actual sections of the excavation. Through such measurement it would indeed be possible to determine the actual profile of the walls of the excavation and, therefore, precisely measure the actual volume of the excavation made.

An excavation is considered more precise when the deviations of the actual profile of the walls of the excavation with respect to the theoretical profile of the walls themselves are less, such a theoretical profile generally being substantially vertical, and when the deviations of the actual axis of the excavation with respect to the theoretical design axis are less. The theoretical three-dimensional shape of the excavation of a panel is defined as the solid having the design section as section and the theoretical design axis along the entire excavation depth as geometric axis.

The deviations of the actual profile of the walls and of the actual axis of the excavation can be caused both by unintentional rotations and/or translations of the excavation device during the excavation step, which make the actual axis of the excavation deviate from the theoretical design axis, and by collapsing or cave-in of the walls of the excavation, which make the actual profile of the wall of the excavation deviate from the theoretical profile. Since an absolute precision in carrying out the excavation is impossible, limit design deviations are established that constitute the maximum allowable deviations of the excavation.

The lack of containment of the deviations of the actual profile of the walls and of the actual axis of the excavation within the values of the limit design deviations results in a reduction in structural strength and in impermeability of the panel. This can lead to catastrophic outcomes like in the case of diaphragm walls made in dams. The importance of the containment of the aforementioned deviations is such that often the customer requires a measurement of the excavation on-site to ascertain that the diaphragm wall is adequate for the functions provided by the design.

Currently, the measurements of the actual profile of an excavation just carried out have remarkable difficulties, as well as being burdensome in terms of time and costs. These difficulties depend on the magnitudes in play, like the excavation depth, which can reach 250 metres for special executions, and given the fact that the excavation, in order to avoid the collapsing thereof, is kept full of a stabilising fluid solution that is of greater density than that of water (for example a mixture of water and slurries). This fluid solution is always cloudy and not uniform. The fact that such a solution is cloudy hampers the use of optical measuring tools (lasers, lidars, infrared, encoders, photosensitive sensors, television cameras, photographic cameras), whereas the fact that it has non-uniform density hampers the use of measuring tools with acoustic sensors (ultrasound, sonar) or wave sensors (radio, microwave, radar), or electro-magnetic sensors.

Currently, one of the most used measuring methods provides the use of a weighted sensor hung on one or more wires, which is lowered inside the excavation at the theoretical design axis. Such a sensor, descending approximately vertically, identifies the shape of the surrounding walls with respect to the axis represented by the suspension cable, allowing the shape of the walls to be traced.

The measurement with this tool can only be carried out after having carried out a sufficient cleaning of the stabilising fluid solution, said cleaning resulting in a great worsening of costs and time taken. Only in this way is it possible to prevent the cloudiness and the non-uniform density of the stabilising solution from altering the correct measuring or even making it impossible, falsifying the reading of the sensor or making such a sensor deviate from the theoretical design axis. In the most extreme cases it may be that the actual profile of the surfaces that constitute the walls of the excavation is so irregular as to be even incompatible with a vertical descent of the sensor, which will end up resting on one of the walls of the excavation. In addition to the serious problems of costs and time necessary for such an operation, it is also impossible to avoid with any certainty that the residual cloudiness of the solution, or the presence of excavation debris gone into suspension after the re-introduction of the solution itself, alter the measurement.

The very great excavation depths make measurement even more difficult since the tool, being hung on a very long segment of free cable, tends to oscillate more easily and it takes longer to stop the oscillations spontaneously. Furthermore, the depth of the excavation hampers the mixing of the clean stabilising fluid solution, which is introduced in the upper part of the excavation, with the cloudier solution present in the lower part. Using such a measuring system it is also necessary to extract the excavation device before carrying out the measurement, with consequent losses of time and productivity. In the opposite case, indeed, it would be impossible to carry out the measurement in the last segment of the excavation, since the latter is still occupied by the excavation device, and it would be extremely difficult to lower the measuring tool along the theoretical design axis, since such descent would be hampered by the presence of the electro-hydraulic feeding tubes of the excavation device and by the presence of the suspension element of the excavation device itself.

There are known excavation devices that use mechanical systems for the correction of the advancing direction of the excavation device. These mechanical correction systems can consist, for example, of flaps moved by actuators as shown in FIG. 1. These mechanical correction systems detect, through the use of inclinometers associated with the excavation device, the inclinations of such an excavation device to provide its advancing direction. The flaps can be actuated to exert a certain pressure against the walls of the excavation, modifying the inclinations of the excavation device in order to correct the advancing direction of the excavation device itself during the excavation step. The movement of the flaps, for example when actuated for the correction of the inclination without carrying out an advancement of the excavation device, can also result in a translation at constant depth of the device on the horizontal plane, moving it with respect to the theoretical design axis. In this case, such a translation at constant depth of the excavation device could not be measured by the inclinometers since such sensors can only detect variations in inclination due to rotations of the excavation device. Consequently, since such mechanical correction systems do not measure the translations, it is not possible to correctly measure either the position of the excavation device with respect to the theoretical design axis, or the progress of the actual axis of the excavation.

Since the actuated flaps must change the direction of an excavation device that can weigh even many tens of tonnes, such flaps are equipped with actuators capable of exerting forces of remarkable intensity against the walls of the excavation. These forces, in some cases, could be such as to deform the walls of the excavation in the contact areas with the flaps, resulting in possible problems concerning the precision of the excavation being made.

Moreover, such mechanical systems cannot measure the deviations of the actual profile of the walls of the excavation, since they cannot establish whether the translations at constant depth of the excavation device, in a direction perpendicular to the theoretical design axis, are due to translation movements of the excavation device, or to deviations of the actual profile of the walls of the excavation. In fact, if there is a cave-in of the wall of the excavation and the excavation device is resting on such a cave-in, thus carrying out a horizontal translation at constant depth, the inclinometers could not measure such a translation of the excavation device, since such sensors can only detect variations in inclination due to rotations of the excavation device. The translation movements of the excavation device during the rising step of the excavation device are accentuated by the presence of clearances between the device and the walls of the excavation, due to the upsetting of the walls carried out by the excavation device itself during subsequent excavation steps.

Other known systems for measuring the deviations of an excavation for making panels are described, for example, in documents EP 2623677 and JP H06208456. These documents teach to calculate the deviations of the advancing direction of the excavation device through the direct measurement of the movements of the suspension cables of such a device. Such systems do not, however, allow to obtain a measurement of the actual profile of the walls di excavation. Indeed, such systems consider that the actual section of the excavation always has the same area and the same shape at each depth. Hence, they are not able to measure cave-ins or any irregularity of the actual profile of the walls such as to vary the actual area or the actual shape of the excavation with respect to the design section.

Moreover, such measuring systems have numerous drawbacks due, for example, to the presence of vibrations of the cables and to the need for constant cleaning of such cables, said drawbacks making the measurements through optical sensors difficult. Moreover, the wearing of the cables can reduce the precision of measurement. A further drawback is due to the fact that whenever it is necessary to move the excavation machine to position it on the point at which a new excavation is made, the measuring system must be moved or oriented again.

SUMMARY AND OBJECT OF THE INVENTION

The purpose of the present invention is therefore to make a measuring device of an excavation site carried out with an excavation machine that is capable of solving the aforementioned drawbacks of the prior art in an extremely simple, cost-effective and particularly functional manner.

This purpose according to the present invention is accomplished by making a measuring device of an excavation site carried out with an excavation machine as outlined in the appended claims.

Further characteristics of the invention are highlighted by the dependent claims, which are an integral part of the present description.

BRIEF DESCRIPTION OF THE DRAWINGS

The characteristics and advantages of a device for measuring the excavation profile and for measuring the deviations of the excavation according to the present invention will become clearer from the following description, given as an example and not for limiting purposes, referring to the attached schematic drawings, in which:

FIGS. 3A and 3B show a partial view of the measuring device of an excavation site according to the present invention, illustrated in the operative configurations respectively of minimum and maximum inclination of the corresponding profile measuring apparatus;

DETAILED DESCRIPTION OF THE INVENTION

Figure 1:
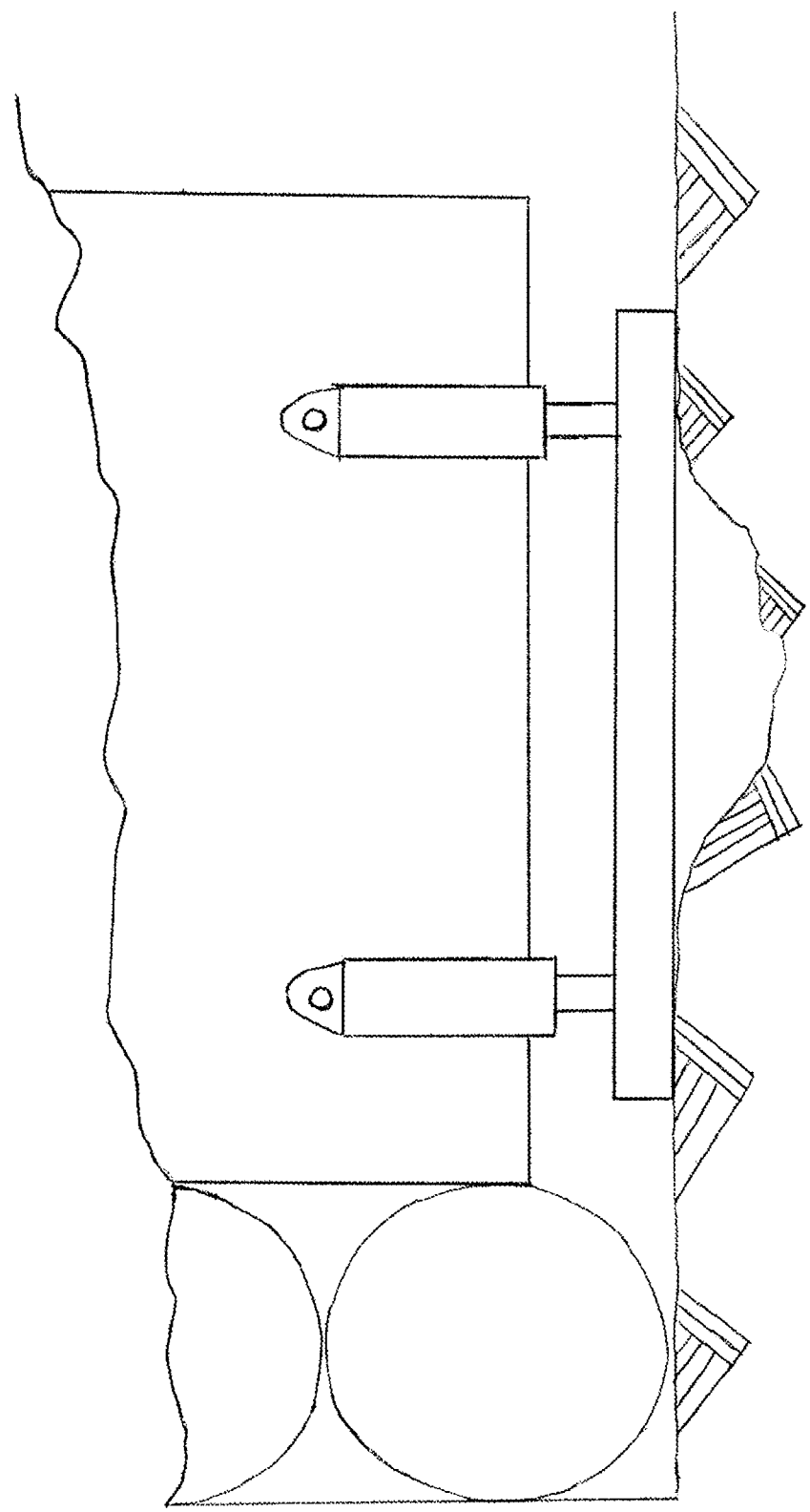
FIG. 1 is a partial view of a known mechanical system for correcting the advancing direction of an excavation device for making panels.
Figure 2:
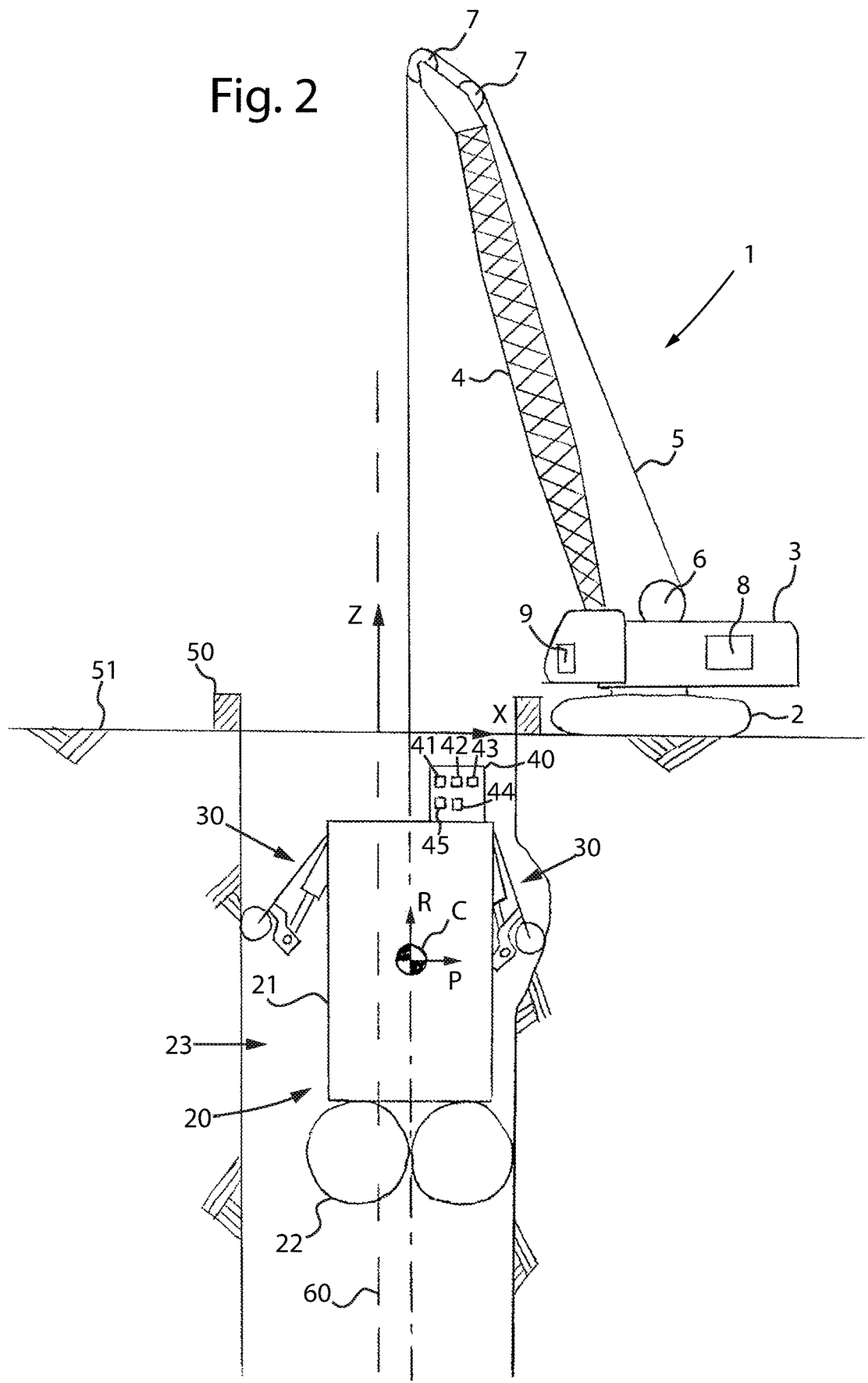
FIG. 2 shows a machine for the excavation of panels or diaphragms, with excavation device equipped with cutting wheels, on which a measuring device of an excavation site according to the present invention is installed.

With reference in particular to FIG. 2, an excavation machine 1 for making panels is shown. The excavation machine 1 comprises an undercarriage system 2 for moving such an excavation machine 1 on the ground. The undercarriage system 2 has a rotary tower 3 on top, said tower 3 being equipped with an operator's cabin and with a tiltable arm 4. The excavation machine 1, also called base machine, can for example be a cable excavator or a crane, or a tracked drill with a vertical tower. In the rest of the present description, for the sake of simplicity, reference will be made to an excavation machine 1 with tiltable arm 4 like that of FIG. 2, although the invention can be applied to an excavation machine provided with any support structure of an excavation device 20, like for example a vertical tower, or a machine in which the tiltable arm 4 could be with a beamed box-shaped structure.

The excavation machine 1 also comprises a movement device 6, preferably a winch associated with the rotary tower 3. The winch 6 actuates a suspension element 5 that, after having been relayed by one or more pulleys 7 arranged at the end of the arm 4, connects to a measuring device 23. The suspension element 5, preferably consisting of a flexible cable, performs the task of moving and supporting the measuring device 23. The excavation machine 1 is also associated with a monitor 9, preferably installed in the cabin. It should be understood that in an equivalent manner the measuring device 23 can be applied to any support structure arranged to support and move such a measuring device 23 inside an excavation by means of a suspension element 5.

The measuring device 23 comprises at least one supporting frame 21, connected to the suspension element 5 and arranged to be inserted into the excavation site of a panel and to be moved, preferably with a substantially vertical translation, inside such an excavation. The measuring device 23 also comprises a sensor system 40, associated with the supporting frame 21, at least one profile measuring apparatus 30, also associated with the supporting frame 21, and a data processing system 8. In the preferred embodiment shown in FIG. 2 the data processing system 8 is associated with the excavation machine 1, but it could also be advantageously associated with the supporting frame 21 of the measuring device 23.

In a preferred embodiment the supporting frame 21, with which the sensor system 40, the profile measuring apparatuses 30 and possibly the data processing system 8 of the measuring device 23 are associated, can be the structural frame of an excavation device 20, like for example a mill, a cutter or a bucket. The excavation device 20 in such a case comprises a supporting frame 21 that constitutes the bearing structure of the excavation device 20 itself and also comprises one or more excavation or cutting tools 22 connected to such a supporting frame 21, preferably positioned below the supporting frame 21 itself. The excavation device 20 can be equipped with any excavation or cutting tool 22, for example milling or mixing wheels, or valves, even if in the figures it is shown in a preferred but not limiting configuration having milling wheels as excavation or cutting tools 22.

In the embodiment shown in FIG. 2, in which the supporting frame 21 is comprised in an excavation device 20 (which in particular is a milling cutter), such an excavation device 20 advances removing the ground, which is first cut by the milling wheels 22, which reduce it into a small piece size, and then pumped towards the surface through a pump installed on the supporting frame 21 of the excavation device 20, exploiting the mixing of the debris with the bentonitic fluid present inside the excavation site. The weight of the excavation device 20 bears down at least partially on the milling wheels 22, generating the advancing force of such an excavation or cutting tool 22 on the bottom of the excavation.

During the advancing step of the excavation it is possible for the excavation device 20 and the supporting frame 21 to deviate from the theoretical design axis 60. An example of an operative condition in which such deviations can occur is when each of the excavation or cutting tools 22, for example the milling wheels, simultaneously removes ground of different hardness and consistency. This can occur, for example, because one milling wheel 22 encounters rocky ground and the other milling wheel 22 encounters sandy ground, with consequent deviation of the excavation in the direction of the most easily excavated ground.

Figure 4:
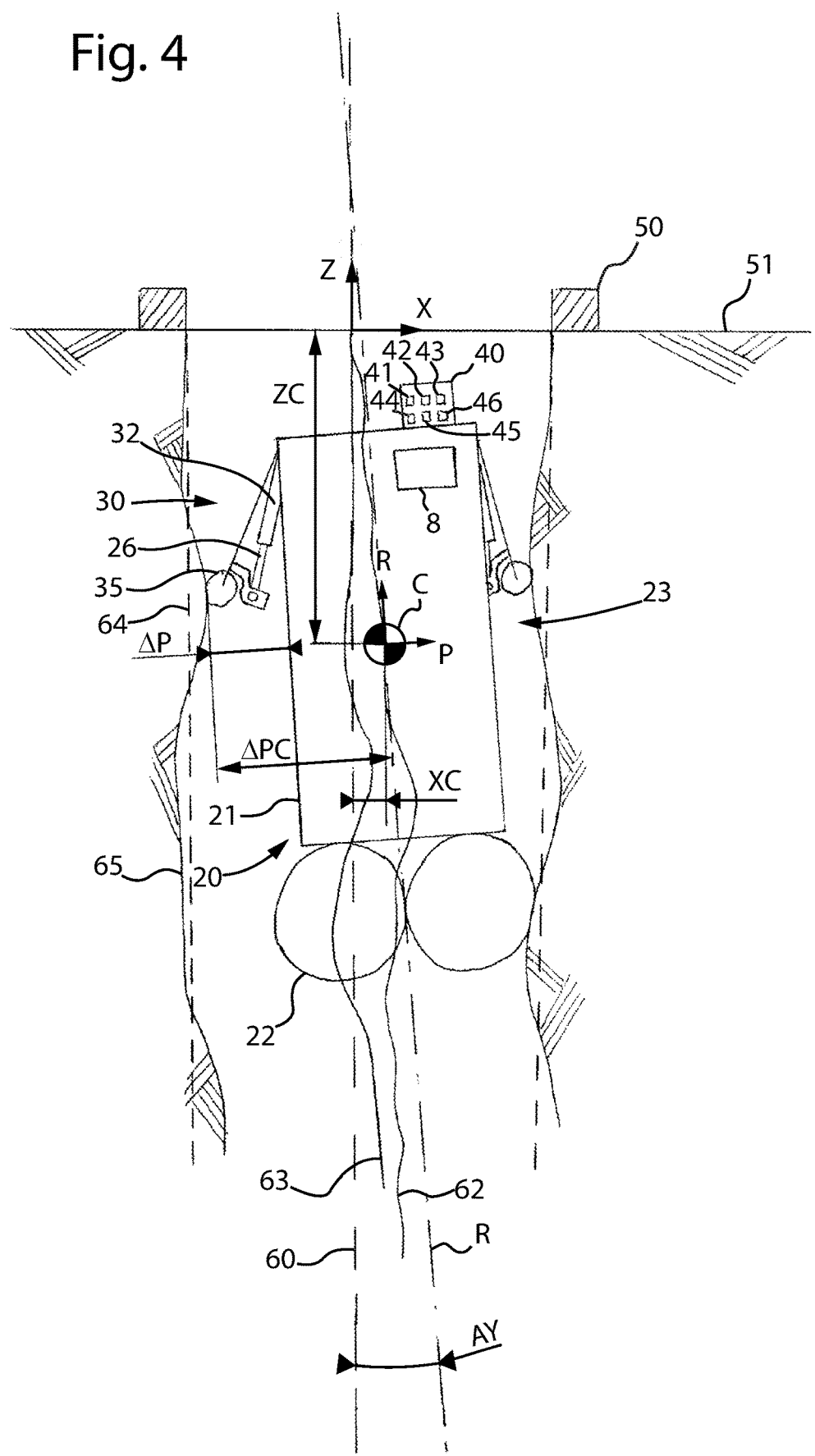
FIG. 4 shows an embodiment of the measuring device of an excavation site according to the present invention during a measurement step of the excavation site.

With reference to FIGS. 2 and 4, in order to describe the operation of the measuring device 23 letters X, Y, Z will be presumed to indicate an absolute orthogonal reference system in which:

the axis Z coincides with the theoretical design axis 60, which is substantially vertical, and
the axis X is parallel to the side of the design section having a greater size.

The origin of the absolute orthogonal reference system is the intersection between the axis Z and the ground level 51.

A guide bar 50, having a passage section coinciding with the design section, is arranged at ground level 51 to guide the supporting frame 21 of the excavation device 20 in the initial segment of the excavation. In particular, the guide bar 50 is positioned so that the centre of symmetry of the passage section is on the theoretical design axis 60.

Letters P, Q, R indicate a relative orthogonal reference system, fixedly connected to the supporting frame 21 of the measuring device 23 and having origin in the geometric centre C of such a supporting frame 21. The relative orthogonal reference system has the axis R, also defined as longitudinal axis of the supporting frame 21, parallel to the longer side of the supporting frame 21 of the excavation device 20, whereas the axis Q is parallel to the shorter side of such a supporting frame 21. More generally, it should be understood that the axis R is parallel to the dimension of the supporting frame 21 that extends substantially parallel to the axis Z, therefore such an axis R extends substantially parallel to the axis Z of the absolute orthogonal reference system X, Y, Z, as can be seen with reference to FIG. 4.

The sensor system 40 is associated with the supporting frame 21 of the excavation device 20 and is made up of at least three rotation sensors 41, 42 and 43 for measuring at least three rotations of the supporting frame 21, as well as at least two translation sensors 44 and 45 for measuring at least two translations of such a supporting frame 21. The rotation sensors 41, 42 and 43 measure in particular the rotation angles AX, AY, AZ of the supporting frame 21 around the axes X, Y, Z of the absolute orthogonal reference system. The rotation angles AX, AY, AZ are representative of the orientation of the supporting frame 21 with respect to the absolute orthogonal reference system. The rotation angles AX, AY, AZ will be described in greater detail with reference to FIG. 4. The translation sensors 44 and 45 measure in particular the movements XC, YC of the geometric centre C of the supporting frame 21 with respect to the theoretical design axis 60. The movements XC, YC are representative of the translations of the supporting frame 21 of the measuring device 23 on a plane X-Y perpendicular to the theoretical design axis 60. The movement of the geometric centre C of the supporting frame 21 with respect to ground level 51 is indicated with ZC. The movement ZC is representative of the depth at which the supporting frame 21 and the excavation device 20 are located. The movements XC, YC will be described in greater detail with reference to FIG. 4.

In a preferred configuration the sensor system 40 comprises three rotation sensors 41, 42 and 43 for measuring the three rotation angles AX, AY, AZ and three translation sensors 44, 45 and 46 for measuring the three movements XC, YC, ZC. Preferably, the rotation sensors 41, 42 and 43 are gyroscopes, for example mechanical gyroscopes, MEMS, lasers or optical fibres, and can return a signal representative of the corresponding rotation angle AX, AY, AZ, or representative of the corresponding angular speed. It should be understood that, if the three gyroscopes 41, 42 and 43 provide the values of three angular speeds, it will be necessary to proceed to the integration of such angular speeds to obtain the measurement of the three rotation angles AX, AY, AZ.

Preferably, the translation sensors 44, 45 and 46 are accelerometers, for example mechanical, acoustic, vibration, piezoelectric, capacitive, MEMS, magnetic or optical accelerometers. It should be understood that it will be necessary to proceed to the double integration of the accelerations measured by such accelerometers 44, 45 and 46 to obtain the measurement of the three movements XC, YC, ZC. It should also be understood that the measurement of the movement ZC, representative of the depth at which the supporting frame 21 and the excavation device 20 are located, can also be carried out through the use of different sensors and methods, for example through the use of an encoder associated with the winch 6 or through sensors, just by way of example optical sensors, for reading the unwinding of the suspension element 5 from the winch 6.

The sensor system 40, or only a group of sensors belonging to such a sensor system 40, can be associated with the supporting frame 21 through the use of stabilised platforms, or it can be rigidly constrained to the supporting frame 21 itself. If the sensor system 40 is associated with the supporting frame 21 through the use of stabilised platforms, it would be possible to keep the sensor system 40 always aligned with the absolute orthogonal reference system X, Y, Z, so that the accelerations measured by the accelerometers 44, 45 and 46 are the accelerations of the supporting frame 21 with respect to such an absolute orthogonal reference system X, Y, Z. If the sensor system 40 is rigidly constrained to the supporting frame 21, the accelerations measured by the accelerometers 44, 45 and 46 would be the accelerations of the supporting frame 21 with respect to the relative orthogonal reference system P, Q, R and it would thus be necessary to project such accelerations on the absolute orthogonal reference system X, Y, Z by knowing the orientation of the supporting frame 21 with respect to such an absolute orthogonal reference system X, Y, Z.

The supporting frame 21 generally has a substantially parallelepiped shape, with the longer dimension along the longitudinal axis R, and can have a tubular or box-like constructive structure. On the supporting frame 21 of the excavation device 20 it is possible to approximate four outer side surfaces, two of which are parallel to the plane R-Q and two are parallel to the plane R-P. Preferably, the section of the supporting frame 21 is smaller both than the actual section of the excavation, and than the space occupied by the excavation tools 22, in this way determining the presence of gaps between the outer side surfaces of the supporting frame 21 and the side walls of the excavation. These gaps allow to house both the profile measuring apparatuses 30, and protective shields 28, which project at least partially with respect to the outer side surfaces of the supporting frame 21. Such protective shields 28 will be described better with reference to FIGS. 3A and 3B.

The profile measuring apparatuses 30 are preferably associated close to the outer side surfaces of the supporting frame 21 of the excavation device 20, so as to extend projecting with respect to such side surfaces of the supporting frame 21 on a plane substantially perpendicular to the longitudinal axis R, and facing the side walls of the excavation. In an equivalent variant embodiment, the profile measuring apparatuses 30 could be associated close to the upper surface or the lower surface of the supporting frame 21 of the excavation device 20, so as to extend on a plane substantially perpendicular to the longitudinal axis R, facing the side walls of the excavation. Preferably, there are at least four profile measuring apparatuses 30 and at least one of them is respectively associated close to each outer lateral surface of the supporting frame 21. Preferably, the profile measuring apparatuses 30 are installed on the supporting frame 21 so as to form at least one first group, made up of at least four profile measuring apparatuses 30 all arranged at the same height along the longitudinal axis R. In other words, all of the profile measuring apparatuses 30 lie on a same plane parallel to the plane P-Q and installed so that at least two first profile measuring apparatuses 30 extend substantially in the direction of the axis P, with opposite directions to one another, and at least two second profile measuring apparatuses 30 extend substantially in the direction of the axis Q, with mutually opposing directions. The profile measuring apparatuses 30 are thus arranged in pairs along two respective axes P, Q perpendicular to one another. In this way, a profile measuring apparatus 30 will act on each of the four side walls of the excavation.

In a second embodiment of the measuring device 23 the profile measuring apparatuses 30 can be installed so as to form more groups on a same supporting frame 21. In particular, each group is made up of at least four profile measuring apparatuses 30 arranged at the same height along the longitudinal axis R, i.e. lying on a same plane parallel to the plane P-Q and installed so that at least two first profile measuring apparatuses 30 extend substantially in the direction of the axis P, with mutually opposing directions, and at least two second profile measuring apparatuses 30 extend substantially in the direction of the axis Q, with mutually opposing directions.

FIGS. 3A and 3B show a preferred embodiment of a profile measuring apparatus 30, in the operative configurations of minimum and maximum inclination. The profile measuring apparatus 30 consists of a base 38 for connecting to the supporting frame 21. A movable arm 37 that supports at least one feeler element 35 is hinged on this base 38, about a first pin 39. The feeler element 35, preferably a feeler roller, is constrained to the opposite end of the movable arm 37 with respect to the first pin 39. The feeler roller 35 is connected to the movable arm 37 through a second pin 34 that allows it to rotate freely. The movable arm 37 is then connected to the base 38 through a buffer 25, the total length L of which determines the inclination of the movable arm 37 with respect to the base 38.

In an embodiment the buffer 25 comprises an extractable element 26 and a fixed part 27 and therefore it can vary its total length L, passing from a completely contracted condition to a completely extended condition. This variation of total length L of the buffer 25 corresponds to an angular rotation of the movable arm 37 with respect to the first pin 39, so that the movable arm 37 can pass from a minimum inclination to a maximum inclination with respect to the base 38. The maximum inclination of the movable arm 37 can be limited through an adjustable mechanical end-stroke.

Each buffer 25 comprises, inside the fixed part 27, an elastic element 32 that exerts an elastic reaction force on the extractable element 26. The elastic reaction force tends to keep the movable arm 37 inclined at the maximum allowed inclination, in other words with the buffer 25 completely withdrawn and the corresponding feeler roller 35 in position of maximum protrusion from the supporting frame 21, unless such an elastic reaction force is overcome by an external force. Preferably, the elastic element 32 is a mechanical spring, but it could advantageously consist of a gas spring or any other element capable of exerting an elastic reaction force.

The buffer 25 is instrument-equipped, i.e. it comprises at least one position transducer 33 for measuring the total length L of such a buffer 25, in particular detecting the relative position of the extractable element 26 with respect to the fixed part 27. The position transducer 33 sends to the data processing system 8 a signal representative of the position of the extractable element 26, allowing the calculation of the total length L of the buffer 25. In this way, knowing the length of the movable arm 37, the dimensions of the feeler element 35 and the positions of the hinging points of the buffer 25, it is possible to calculate, as a function of the position of the extractable element 26, the inclination of the movable arm 37 and the position of the outer surface of the feeler element 35 with respect to the base 38.

Every profile measuring apparatus 30 is fixed to the supporting frame 21 of the measuring device 23 so that, as the inclination of the movable arm 37 varies, the distance of the outer surface of the feeler element 35 with respect to the outer side surfaces of the supporting frame 21 varies. In particular, such fixing means that, as the inclination of the movable arm 37 varies, the distance of the outer surface of the feeler element 35 with respect to the longitudinal axis R of the supporting frame 21 varies in a direction perpendicular to such an axis.

Preferably, the supporting frame 21 is equipped with one or more protective shields 28 (FIGS. 3A and 3B) that are configured to project from a corresponding outer side surface of the supporting frame 21 by an amount such that, in a certain operative condition of the supporting frame 21, in other words when the profile measuring apparatus 30 is at the minimum inclination, the profile measuring apparatuses 30 remain within the space occupied by each protective shield 28.

In other words, in such an operative condition of the supporting frame 21, each protective shield 28 projects from the corresponding outer side surface of the supporting frame 21 by a greater amount with respect to the projection of each profile measuring apparatus 30. In this way, when the measuring device 23 is inside the excavation and the supporting frame 21 rests on a wall of the excavation, the force deriving from such contact would bear down entirely on the protective shield 28 and not on the profile measuring apparatus 30.

In order to be able to nullify the effect of the hydrostatic pressure exerted by the stabilising fluid solution present inside the excavation site and increasing as the excavation depth increases, each profile measuring apparatus 30 is provided with a pressure balancing member 31, configured to exert a force on the extractable element 26 that is equal and opposite to that exerted on such an extractable element 26 by the hydrostatic pressure. The pressure balancing member 31 is in communication with the extractable element 26 and with the stabilising fluid solution so that, inside the fixed part 27, it is possible to transfer the pressure of such a fluid solution to the extractable element 26, in order to exert a force on it that is equal and opposite to that exerted by the stabilising fluid solution present inside the excavation. In order to keep the outer surface of each feeler element 35 clean at least one corresponding scraping element 36 is provided.

With reference to FIGS. 3A, 3B and 4 a preferred operating mode of the measuring device 23 object of the invention will now be described. In particular, FIG. 4 shows the case in which the supporting frame 21 of the measuring device 23 is a single supporting frame 21 that supports both such a measuring device 23, and the excavation device 20.

During the start of excavation step the excavation device 20 can be positioned with the excavation tools 22 at ground level 51, or it can be inserted in a pre-excavation having a depth at least comparable to the height of the excavation device 20. The excavation device 20 is positioned so that the longitudinal axis R of the supporting frame 21 matches the theoretical design axis 60.

During the advancing step of the excavation and, more generally, during a descent stroke of the measuring device 23 in a segment of excavation already carried out (this condition occurs, for example, in the case in which the supporting frame 21 contains only the measuring device 23 and not also the excavation device 20), the feeler elements 35 of the profile measuring apparatuses 30 always and autonomously remain in contact with the corresponding lateral wall of the excavation site to which each profile measuring apparatus 30 faces, without exerting a force such as to deform the wall itself, by means of the elastic reaction force exerted by the elastic element 32 on the extractable element 26. In this way, each profile measuring apparatus 30 follows exactly the actual profile 65 of the corresponding lateral wall of the excavation site along the entire excavation depth.

Purely as an example, it should be understood from FIG. 4 that the actual profile 65 of a lateral wall of the excavation site, for example a lateral wall of the excavation site substantially parallel to the plane Z-Y, should be interpreted as the line deriving from the intersection between such a lateral wall of the excavation site and a plane parallel to the plane Z-X passing through the point of contact between the lateral wall and the feeler element 35 belonging to the profile measuring apparatus 30 that faces such a lateral wall of the excavation site.

The rough areas or the cavities of the actual profile 65 of the wall of the excavation respectively determine an approach or movement away of the feeler element 35 of each profile measuring apparatus 30 that faces such a wall of the excavation with respect to the outer lateral surface of the supporting frame 21 with which such a profile measuring apparatus 30 is associated. This approach or movement away of the feeler element 35 takes place on a plane substantially perpendicular to the longitudinal axis R. In particular, the geometry of the profile measuring apparatus 30 is determined so that, during a descent stroke of the measuring device 23, there is no jamming of the feeler element 35 against the walls of the excavation in order to avoid breaking of the measuring device 23 itself.

In particular, with reference to FIG. 3B, it can be understood that the contact between the rough areas of the wall and the feeler roller 35 can only take place on the part of roller 35 that projects with respect to the protective shield 28. The arrangement of the fulcrums of the profile measuring apparatus 30 is such that any contact force applied on the aforementioned part of the roller 35, irrespective of the direction of the force, generates a reduction of the inclination of the movable arm 37, i.e. an approach of the roller 35 towards the longitudinal axis R of the supporting frame 21.

At the end of the excavation, or in any case once the design depth has been reached, the supporting frame 21 will inevitably have undergone unintentional translations and rotations, both due to the irregularities of the ground, and due to the fact that it is impossible to perfectly control the advancing direction of the excavation device 20. Such translations and rotations ensure that, at the end of the execution of the excavation, or in any case at the end of the descent of the measuring device 23 in the excavation, the longitudinal axis R of the supporting frame 21 does not match the theoretical design axis 60.

Preferably but not for limiting purposes, the measurement of the excavation through the measuring device 23 is carried out at the end of the advancing step of the excavation, carrying out a rising stroke of the measuring device 23 from the bottom of the excavation up to ground level 51. During such a rising stroke, the supporting frame 21, as well as translating in the direction of the axis Z, is also subject to small and repeated translations on the plane X-Y due to the clearances present both between the supporting frame 21 and the side walls of the excavation, and between the possible excavation tools 22 and such walls. Due to such translations on the plane X-Y the geometric centre C of the supporting frame 21 is moved, moment by moment, with respect to the theoretical design axis 60 by the amounts XC and YC, representative of the translations of the supporting frame 21 on a plane perpendicular to the theoretical design axis 60. ZC indicates the height of the geometric centre C with respect to ground level 51, such a height ZC being representative of the excavation depth.

During the rising stroke of the measuring device 23, the supporting frame 21 and the excavation device 20 can also undergo rotations about the axes X, Y, Z of the absolute orthogonal reference system, forming the angles AX, AY, AZ representative of the orientation of the supporting frame 21 with respect to such an absolute orthogonal reference system with such axes.

During the rising stroke of the measuring device 23, the feeler elements 35 of the profile measuring apparatuses 30 always and autonomously remain in contact with the corresponding lateral wall of the excavation site to which each profile measuring apparatus 30 faces, without exerting a force such as to deform the wall itself, by means of the elastic reaction force exerted by the elastic element 32 on the extractable element 26. In this way, each profile measuring apparatus 30 exactly follows the actual profile 65 of the corresponding lateral wall of the excavation site along the entire excavation depth.

The rough areas or the cavities of the actual profile 65 of the wall of the excavation site respectively determine an approach or a movement away of the feeler element 35 of the profile measuring apparatus 30 that faces such a wall of the excavation site with respect to the outer lateral surface of the supporting frame 21 with which such a profile measuring apparatus 30 is associated. This approach or movement away of the feeler element 35 takes place on a plane substantially perpendicular to the longitudinal axis R. In particular, the geometry of each profile measuring apparatus 30 is determined so that, during a rising stroke of the measuring device 23, jamming of the feeler element 35 against the walls of the excavation does not occur in order to avoid the breaking of the measuring device 23 itself.

ΔP (see FIG. 4) indicates the distance, with respect to an outer surface of the supporting frame 21 normal to the axis P, of the point of contact between the feeler element 35 of a profile measuring apparatus 30 that extends substantially in the direction of the axis P and the lateral wall of the excavation site that faces such a surface of the frame 21. The distance ΔP is thus measured along the axis P at the point of contact between the feeler element 35 and the wall of the excavation.

ΔQ indicates the distance, with respect to an outer surface of the supporting frame 21 normal to the axis Q, of the point of contact between the feeler element 35 of a profile measuring apparatus 30 that extends substantially in the direction of the axis Q and the lateral wall of the excavation site that faces such a surface of the frame 21. The distance ΔQ is thus measured along the axis Q at the point of contact between the feeler element 35 and the wall of the excavation.

By knowing the geometry of the profile measuring apparatus 30 and the position of the pin 39 of the movable arm 37 with respect to the outer lateral surface of the supporting frame 21 with which such a profile measuring apparatus 30 is associated, the data processing system 8 calculates the distance ΔP of the wall of the excavation on which the feeler element 35 remains in contact with respect to the outer lateral surface of the supporting frame 21. In particular, by knowing the orientation of the base 38 for connecting the profile measuring apparatus 30 it is possible to define a value ΔP0, representative of the distance ΔP when the extractable element 26 has a stroke equal to zero, and it is possible for the data processing system 8 to calculate the distance ΔP based on the signal representative of the position of the extractable element 26 sent by the position transducer 33 to such a data processing system 8. Preferably, the data representative of the geometry of the profile measuring apparatus 30 are preloaded inside the data processing system 8, or they can be inserted manually by the operator through the monitor 9.

ΔPC (see FIG. 4) indicates the distance, with respect to the longitudinal axis R of the supporting frame 21, of the point of contact between the feeler element 35 of a profile measuring apparatus 30 that extends substantially in the direction of the axis P and the wall of the excavation on which the contact takes place. The distance ΔPC is thus measured along the axis P at the point of contact between the feeler element 35 and the wall of the excavation.

ΔQC indicates the distance, with respect to the longitudinal axis R of the supporting frame 21, of the point of contact between the feeler element 35 of a profile measuring apparatus 30 that extends substantially in the direction of the axis Q and the wall of the excavation on which the contact takes place. The distance ΔQC is thus measured along the axis Q at the point of contact between the feeler element 35 and the wall of the excavation.

By knowing the geometry of the profile measuring apparatus 30, knowing the geometry of the supporting frame 21, in other words knowing the predetermined shape and sizes of such a supporting frame 21, and knowing the position of the pin 39 of the movable arm 37 with respect to the longitudinal axis R of the supporting frame 21, the data processing system 8 calculates the distances ΔPC and ΔQC of the walls of the excavation from the longitudinal axis of the supporting frame 21. The data processing system 8 calculates the distances ΔPC and ΔQC based on the signal representative of the position of the extractable element 26 sent to such a data processing system 8 by the position transducer 33 of every profile measuring apparatus 30.

Figure 5:
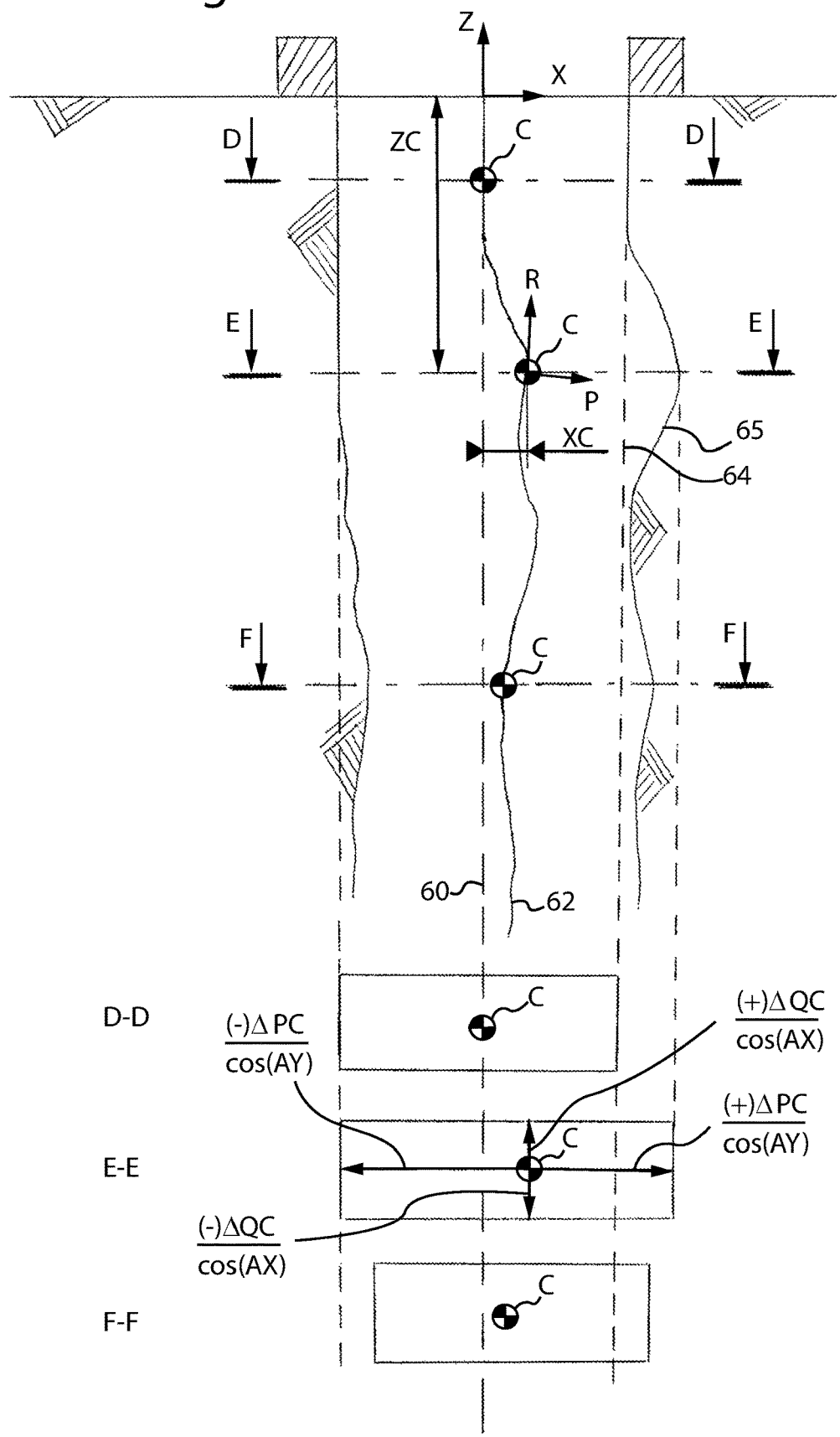
FIG. 5 illustrates some examples of sections of the excavation measured through the measuring device of an excavation site according to the present invention.

FIG. 5 further clarifies the operation of the measuring device 23 object of the invention. As an example three actual sections of the excavation are shown, indicated with D-D, E-E, F-F, arranged at different excavation depths ZC. In particular, the section D-D coincides with the design section, the section E-E has a cave-in and the section F-F is translated with respect to the design section. For the sake of simplicity, the operation will be illustrated with reference to the section E-E and it will be presumed that the measuring device 23 comprises four profile measuring apparatuses 30 all arranged at the same height along the longitudinal axis R, i.e. all lying on a same plane parallel to the plane P-Q. Through the four profile measuring apparatuses 30 the data processing system 8 calculates four distances, two of which are ΔPC and two ΔQC, of the walls of the excavation from the longitudinal axis R of the supporting frame 21. For the sake of simplicity, a positive sign is attributed to the distance ΔPC identified in the direction of the axis P evaluated with direction in accordance with it and a positive sign is attributed to the distance ΔQC identified in the direction of the axis Q evaluated with direction in accordance with it. Similarly, a negative sign is attributed to the distance ΔPC identified in the direction of the axis P evaluated with direction not in accordance with it and a negative sign is attributed to the distance ΔQC identified in the direction of the axis Q evaluated with a direction not in accordance with it.

By knowing the rotation angles AX, AY, AZ of the supporting frame 21 about the axes X, Y, Z of the absolute orthogonal reference system, the data processing system 8 projects the distances ΔPC and ΔQC on the axes X, Y, Z of the absolute orthogonal reference system. By knowing both the rotation angles AX, AY, AZ of the supporting frame 21 about the axes X, Y, Z of the absolute orthogonal reference system, and the movements XC and YC of the geometric centre C of the supporting frame 21 with respect to the theoretical design axis 60, and knowing at least one distance ΔPC or ΔQC of at least one wall of the excavation from the longitudinal axis R of the supporting frame 21, the data processing system 8 calculates the distance of such at least one wall of the excavation with respect to the theoretical design axis 60.

In particular, in the preferred embodiment, knowing both the rotation angles AX, AY, AZ of the supporting frame 21 about the axes X, Y, Z of the absolute orthogonal reference system, and the movements XC and YC of the geometric centre C of the supporting frame 21 with respect to the theoretical design axis 60, and knowing at least four distances, at least two of which are ΔPC and at least two are ΔQC, of the walls of the excavation from the longitudinal axis R of the supporting frame 21, the data processing system 8 calculates the actual area and the actual shape of the actual section E-E of the excavation and the position of such an actual section with respect to such an absolute orthogonal reference system and with respect to the design section. Preferably, the actual shape is approximated to a rectangle. In other words, the data processing system 8 is capable of calculating both the sides of the rectangular section of the excavation (therefore the actual area and the actual shape of the actual section of the excavation, i.e. also how much the rectangle of the actual section can be elongated), and also how such a rectangle is positioned with respect to the geometric centre C of the supporting frame 21. In the preferred embodiment of the measuring device 23, which provides four profile measuring apparatuses 30 all arranged at the same height along the longitudinal axis R, such an arrangement of the profile measuring apparatuses 30 is advantageous, since it allows the simultaneous measurement of the distances ΔPC and ΔQC of a same actual section of the excavation.

In order to carry out the measurement of the excavation when rising, once the start of measurement position has been reached:

the movement of the measuring device 23 is stopped and such a position is considered as the initial point of the trajectory of the geometric centre C of the supporting frame 21;

a zero speed is considered as the initial measuring speed;

the orientation of the supporting frame 21 is considered as initial measurement orientation;

the rotation angles AX, AY, AZ of the supporting frame 21, as well as the distances ΔPC and ΔQC of the walls of the excavation from the longitudinal axis R of the supporting frame 21 are measured;

the actual area and the actual shape of the initial actual section of the measured excavation are calculated;

the measuring device 23 is moved upwards, with a substantially vertical translation and measurements are carried out at intervals of the depth ZC along the entire excavation depth. At every height ZC, based on the values of the three rotation angles AX, AY, AZ measured by the three rotation sensors 41, 42 and 43, as well as based on the values of the three movements XC, YC, ZC measured by the three translation sensors 44, 45 and 46, the data processing system 8 calculates both the trajectory 62 of the geometric centre C of the supporting frame 21 with respect to the initial point of such a trajectory 62, and the orientation of the supporting frame 21 with respect to the initial measurement orientation. At every height ZC the data processing system 8 calculates the trajectory of the geometric centre C interpolating the positions of such a geometric centre C measured at the previous heights, from the initial point of the trajectory;

during the movement of the measuring device 23, based on the signals sent by the position transducer 33 of the at least one profile measuring apparatus 30, i.e. based on the at least one distance ΔPC or ΔQC of the at least one lateral wall of the excavation site, and based on the signals sent by the rotation sensors 41, 42 and 43 and translation sensors 44, 45 and 46, the data processing system 8 calculates, at every depth ZC, the distance of such at least one lateral wall of the excavation site with respect to the theoretical design axis 60. In the case in which the measuring device 23 comprises at least four profile measuring apparatuses 30, the data processing system 8 calculates, at every depth ZC, the actual area and the actual shape of the actual sections of the excavation along the entire excavation depth and the position of such actual sections with respect to the initial actual section of the excavation measured. At every height ZC the data processing system 8 calculates the actual profile 65 of at least one lateral wall of the excavation site carrying out an envelope of the distances of said at least one lateral wall of the excavation site with respect to the theoretical design axis 60 measured at the previous heights, from the start of measurement position;

at the end of the movement of the measuring device 23, the data processing system 8, once the measuring device 23 has taken up a certain position at the guide bar 50, or at any other certain reference on the ground level 51, carries out a suitable offset of the trajectory of the geometric centre C, so that the final point of the trajectory lies on the theoretical design axis 60. The data processing system 8 also carries out a suitable offset of the actual profile 65 of every lateral wall of the excavation site, so that the final actual section of the excavation measured coincides with the design section. Therefore, the data processing system 8 calculates, with respect to the absolute orthogonal reference system, the trajectory 62 of the geometric centre C and the actual profile 65 of every lateral wall of the excavation site, evaluated with respect to a certain position at the guide bar 50 or at any other certain reference arranged close to ground level 51;

at the end of the measurement, the data processing system 8 calculates, for every lateral wall of the excavation site, the deviations in the direction X or in the direction Y of the actual profile 65 of every lateral wall of the excavation site with respect to the corresponding theoretical profile 64 of each wall and can show such deviations on the monitor 9. More precisely, if the wall is normal to the axis X, the data processing system 8 calculates the deviations of that wall along the axis X, whereas if the wall is normal to the axis Y, the data processing system 8 calculates the deviations of that wall along the axis Y;

at the end of the measurement, the data processing system 8 calculates the actual axis 63 of the excavation, through the interpolation of the centres of symmetry or in general of the barycentres of the actual sections of the excavation measured at the different heights ZC, and calculates the deviations in the direction X and in the direction Y of such an actual axis 63 of the excavation with respect to the theoretical design axis 60 and can show such deviations on the monitor 9;

the data processing system 8 calculates the actual three-dimensional shape of the excavation site, based on the envelope of the actual sections of the excavation measured at the different heights ZC, such an envelope being carried out based on knowing the actual axis 63 of the excavation and knowing the actual profile 65 of every lateral wall of the excavation site, and calculates the actual volume of the excavation made. Such an actual three-dimensional shape of the excavation site can be displayed on the monitor 9 and compared with the theoretical three-dimensional shape. Preferably, the data representative of the theoretical geometry and of the design geometry of the excavation are preloaded inside the data processing system 8, or they can be inserted manually by the operator through the monitor 9.

The considerations applied at the end of the rising of the measuring device 23 are due to the fact that the supporting frame 21 reaches ground level 51, being substantially at the origin of the absolute orthogonal reference system X, Y, Z, and returns to be guided by the guide bar 50. In this way the measuring device 23 is guided by a certain reference, assuming a certain position in which the geometric centre C lies on the theoretical design axis 60 and the actual section of the excavation measured coincides with the design section. This calculation process for measuring the excavation has the advantage of not requiring, at the start of the measurement when rising, knowledge of the position of the initial point of the trajectory with respect to the absolute orthogonal reference system.

In the case of making a particularly deep excavation, which takes a long time to carry out, even more than a day, and a long time for the measuring device 23 to rise, an alternative method for measuring the excavation while rising may be advantageous that provides the use of measuring steps carried out at progressive excavation depths. For this purpose, a first measurement is carried out, carrying out a rising stroke of the measuring device 23 from a start of measurement position at a first intermediate depth, lower than the design depth, to ground level 51, and a subsequent rising stroke of the measuring device 23 from the design depth to such a first intermediate depth.

In an equivalent manner it is possible to carry out the measurement by carrying out many measurement steps, so that at every measurement step a rising stroke of the measuring device 23 is carried out from an intermediate depth up to the intermediate starting depth of the previous measurement step. According to such an alternative measurement method in steps, the depth reached at the end of the rising stroke of every step is equal to the depth of the start of measurement of the previous step, excluding the first measurement step in which a rising stroke to ground level 51 is carried out. In a totally equivalent manner, the alternative measurement method in steps considers that the final point of the trajectory of the geometric centre C, at ground level 51, calculated during rising, lies on the theoretical design axis 60 and considers that the final actual section of the excavation measured coincides with the design section.

In another alternative measurement method, the measuring device 23 is also used for measuring the excavation during a descent stroke of the measuring device 23. In this case the initial point of the trajectory of the geometric centre C of the supporting frame 21 is known, since in the start of measurement position such a supporting frame 21 is suitably positioned, at the guide bar 50 or at any other certain reference arranged close to the ground level 51, so that its geometric centre C lies on the theoretical design axis 60 and the initial actual section of the excavation measured coincides with the design section.

In a totally equivalent manner to what has been described in reference to the measurement method during rising, the measurement method during a descent stroke of the measuring device 23 in the excavation can also be carried out both through a single descent stroke, and through the use of measurement steps carried out at progressive excavation depths. In particular, in the case in which many measurement steps are carried out at progressive excavation depths during the descent of the measuring device 23, at every measurement step a descent stroke of the measuring device 23 is carried out from the intermediate depth reached at the end of the previous measurement step.

In the case in which the measurement of the excavation during a descent stroke of the measuring device 23 is carried out during the advancing step of the excavation, i.e. with the excavation tools 22 actuated, the signals coming from the position transducer 33 of the feeler element 35 and from the rotation sensors 41, 42 and 43 and translation sensors 44, 45 and 46 are suitably filtered by the data processing system 8 to eliminate the disturbances caused by the vibrations of the measuring device 23. These signals, as well as being used for the measurement of the excavation and for the calculation of the deviations, can be used as input data by the data processing system 8 to command actuators installed on the excavation device 20, for example to control the rotation speed of the excavation tools 22, to adjust the inclination of such excavation tools 22 or to actuate the guide flaps of the excavation device 20. The data processing system 8, through the control of the actuators installed on the excavation device 20, can carry out the correction of the advancing direction of the excavation device 20 and keep the deviations calculated by the measuring device 23 within the limit design deviations.

Figure 6:
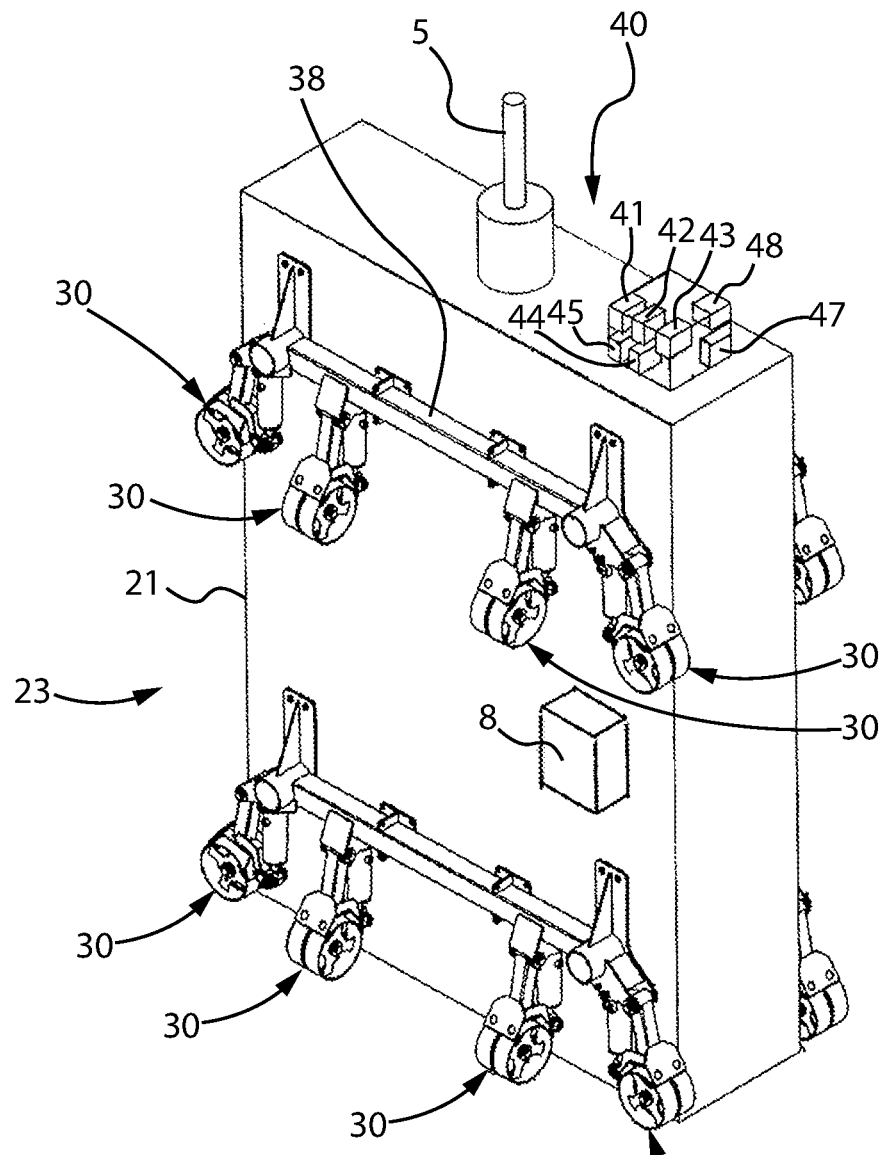
FIG. 6 shows an alternative embodiment of the measuring device of an excavation site according to the present invention.

FIG. 6 shows an alternative embodiment of the measuring device 23 object of the invention. In particular, the case in which the supporting frame 21 is not part of an excavation device 20, but in any case is also applicable to the embodiment in which the supporting frame 21 corresponds to the frame of an excavation device 20 is shown. In such an alternative embodiment of the measuring device 23 object of the invention, in order to improve the precision of measurement during a descent stroke of the measuring device 23, the sensor system 40 of the measuring device 23 comprises at least two inclinometers 47 and 48, arranged for the measurement of the rotation angles AX, AY, at least three gyroscopes 41, 42 and 43, arranged for the measurement of the rotation angles AX, AY, AZ representative of the orientation of the supporting frame 21 with respect to the absolute orthogonal reference system X, Y, Z, and at least two accelerometers 44 and 45, arranged for the measurement of the movements XC, YC representative of the translations of the supporting frame 21 on a plane X-Y perpendicular to the theoretical design axis 60.

The use of the two inclinometers 47 and 48 for the measurement of the rotation angles AX, AY improves the measurement of the excavation, as such inclinometers 47 and 48 are not very sensitive to the vibrations of the measuring device 23 and allow a redundancy of the measurement of such rotation angles AX, AY. This solution can be particularly advantageous in the case in which the measuring device 23 is associated with an excavation device 20 and the measurement of the excavation is carried out during the advancing of the excavation with the excavation tools 22 actuated.

In the alternative embodiment of the measuring device 23 shown in FIG. 6, the profile measuring apparatuses 30 are installed so as to form at least two groups positioned at two different heights along the longitudinal axis R of the supporting frame 21 and each group consists of at least four, and preferably eight, profile measuring apparatuses 30. In each of the at least two groups, at least four profile measuring apparatuses 30 are associated close to the outer side surfaces of the supporting frame 21, so that a profile measuring apparatus 30 will act on each of the four side walls of the excavation site.

Advantageously, as shown by FIG. 6, the base 38 for connecting to the supporting frame 21 can be shaped so that it can be associated with multiple profile measuring apparatuses 30. In this way it is possible to advantageously simplify the mounting step of the profile measuring apparatuses 30 and reduce the manufacturing costs, thanks to the reduction of the number of parts of which they consist.

The embodiment that provides the presence, inside a same group of profile measuring apparatuses 30, of many profile measuring apparatuses 30 simultaneously in contact on the same lateral wall of the excavation site, allows greater precision in determining the actual profile of the wall. In the case in which the measuring device 23 is associated with an excavation device 20 and the measurement of the excavation during a descent stroke of the measuring device 23 is carried out in an excavation made previously, provisions are advantageously taken to keep the excavation tools 22 inactive and not actuated, to limit the vibrations of the measuring device 23 and thus to reduce the computing burden and the calculations times required by the data processing system 8.

It has thus been seen that the measuring device of an excavation carried out with an excavation machine according to the present invention achieves the purposes highlighted earlier, obtaining in particular the following advantages:

- the combined use of the sensor system 40 and of the profile measuring apparatuses 30 makes it possible to know the actual profile of the walls of the excavation both with respect to the supporting frame 21, and with respect to the theoretical design axis 60;
- at every height ZC, the profile measuring apparatuses 30 make it possible to know the actual area and the actual shape of the actual section of the excavation, whereas the sensor system 40 makes it possible to know both the position of the centre of symmetry or barycentre of the excavation section with respect to the theoretical design axis, and how such a section is oriented in the absolute orthogonal reference system X, Y, Z. Knowing these things makes it possible to calculate the actual three-dimensional shape of the excavation site and to calculate the volume thereof. The accuracy in the calculation of the actual volume of the excavation results in economic advantages, since it allows better programming of the casting step and of the worksite means involved in such a step, avoiding interruptions of the casting due to a lack of cement, or avoiding wastages due to a precautional overestimation of the amount of cement necessary; the consequent better programming of the casting step makes it possible to avoid excessive time intervals between one casting step and the next, ensuring uniform hardening of the cement and therefore a better quality of the panel made.
- knowing the actual three-dimensional shape of the excavation site, and therefore of the panel made, allows an accurate calculation of the overlaps of the adjacent panels of a diaphragm wall, as well as the evaluation of the quality of the sealing joints made;
- the measuring device according to the present invention allows to carry out measurements down to greater depths with respect to known measuring tools, because it is not influenced either by the cloudiness of the support fluid of the excavation, or by the length of the suspension cable, i.e. the precision of the measurement of the excavation is independent from possible oscillations of the measuring device itself inside the excavation;
- the possibility of carrying out a precise measurement of the actual three-dimensional shape of the excavation site and of the deviations of the actual excavation axis and of the actual profile of the walls of the excavation during the advancing of the excavation device makes it possible to command actuators for correcting the direction of excavation, associated with such an excavation device, to improve the verticality of the excavation;
- the presence of the buffers in the profile measuring apparatuses makes it possible to keep the respective feeler elements always in contact with the walls of the excavation, without exerting forces of intensity such as to deviate the measuring device or of intensity such as to deform the walls of the excavation;
- when the profile measuring apparatuses are in minimum inclination position (FIG. 3A), the feeler elements preferably remain inside the space occupied by the protective shields of the supporting frame. In this way, when such shields come into contact with the walls of the excavation, the weight of the measuring device discharges on the shields, avoiding damage to the profile measuring apparatuses;
- the operation of the profile measuring apparatuses, which is based on a mechanical contact of the feeler element on the walls of the excavation, is not affected by the cloudiness of the stabilising solution present in the excavation. Moreover, such profile measuring apparatuses do not require a hydraulic or pneumatic feeding system since they do not comprise actuators;
- making the profile measuring apparatus in which the feeler element is a roller is advantageous, for example with respect to a plate, since the roller makes it possible to have a contact area between wall and the roller itself that extends only on a line, instead of on a surface. Therefore, the roller manages to follow the shape of the wall with great precision, being able to insert into the even small recesses of the wall, unlike a plate that, resting at the wall on at least three points, would tend to average both the rough areas and the recesses, arranging itself tangent to them. Moreover, the roller shape of the feeler element avoids jamming of such a feeler element in the walls of the excavation.

The measuring device of an excavation site of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. A measuring device for measuring an excavation site, the measuring device comprising:
    a supporting frame having predefined shape and sizes, arranged to be inserted into the excavation site, said supporting frame being connected to a suspension element to be moved inside the excavation site;
    a profile measuring apparatus, associated with the supporting frame and facing on a corresponding lateral wall of the excavation site for measuring the distance (ΔP, ΔQ) of said lateral wall of the excavation site with respect to said outer lateral surface of the supporting frame, each profile measuring apparatus being provided with a feeler element arranged to remain in contact with said corresponding lateral wall along the whole depth of the excavation site;

a sensor system associated with the supporting frame, said sensor system comprising at least three rotation sensors configured for measuring at least three corresponding rotations (AX, AY, AZ) of the supporting frame with respect to a predefined absolute orthogonal reference system (X, Y, Z), and at least two translation sensors configured for measuring at least two corresponding translations (XC, XY) of said supporting frame with respect to an axis of said absolute orthogonal reference system (X, Y, Z); and a data processing system that is provided for calculating at least the actual profile of said at least one lateral wall of the excavation site based on the rotation (AX, AY, AZ) and translation data (XC, YC) measured by said sensor system, based on the distance (ΔP, ΔQ) of the lateral wall of the excavation site measured by the a profile measuring apparatus, and based on the predefined shape and sizes of the supporting frame.

2. The measuring device according to claim 1, wherein the supporting frame is the structural frame of an excavating device, said excavating device comprising one or more excavation or cutting tools connected to said supporting frame.

3. The measuring device according to claim 1, wherein it comprises a first group of profile measuring apparatuses, consisting of at least four profile measuring apparatuses arranged so that at least two first profile measuring apparatuses substantially extend in the direction of a first axis (P) of a relative orthogonal reference system (P, Q, R), in directions opposite one another, and at least two second profile measuring apparatuses extend substantially in the direction of a second axis (Q) of said relative orthogonal reference system (P, Q, R), in directions opposite one another, wherein said relative orthogonal reference system (P, Q, R) is integral with the supporting frame and originates in the geometrical centre (C) of said supporting frame, and wherein the data processing system is provided to calculate the actual three-dimensional shape of the excavation site based on the rotation (AX, AY, AZ) and translation data (XC, YC) measured by the sensor system, based on the distance (ΔP, ΔQ) of the lateral walls of the excavation site with respect to the outer lateral surface of the supporting frame measured by the first group of profile measuring apparatuses, and based on the predefined shape and sizes of the supporting frame.

4. The measuring device according to claim 3, further comprising a second group of profile measuring apparatuses, said second group of profile measuring apparatuses being positioned at a different height with respect to said first group of profile measuring apparatuses along an axis (R) of said relative orthogonal reference system (P, Q, R), said axis (R) of said relative orthogonal reference system (P, Q, R) extending substantially parallel to an axis (Z) of said absolute orthogonal reference system (X, Y, Z).

5. The measuring device according to claim 1, wherein each profile measuring apparatus consists of a base connecting to the supporting frame, wherein a movable arm that supports a feeler element is hinged on said base about a first pin so as to extend protruding in a substantially normal direction with respect to an outer lateral surface of said supporting frame, and wherein said movable arm is then connected to said base by means of a buffer provided with a position transducer, said position transducer being arranged to send to the data processing system a signal for calculating the inclination of the movable arm and the position of the outer surface of the feeler element with respect to the supporting frame.

6. The measuring device according to claim 5, wherein each buffer comprises an extractable element and a fixed part, said buffer therefore being capable of varying its total length (L) by passing from a completely contracted condition to a completely extended condition.

7. The measuring device according to claim 6, wherein each buffer further comprises, inside the fixed part, an elastic element that exerts an elastic reaction force on the extractable element, said elastic reaction force keeping the movable arm tilted at the maximum inclination allowed, i.e. with the buffer completely extracted and the corresponding feeler roller in position of maximum projection from the supporting frame.

8. The measuring device according to claim 5, wherein each profile measuring apparatus is provided with a pressure balancing member configured to compensate for the effect of the hydrostatic pressure of a stabilising fluid solution possibly present inside the excavation site.

9. The measuring device according to claim 5, wherein each feeler element consists of a roller rotatably constrained, by means of a second pin, to the opposite end of the movable arm with respect to the first pin.

10. The measuring device according to claim 9, wherein the profile measuring apparatus comprises a scraping element arranged to keep the outer surface of a corresponding feeler roller clean.

11. The measuring device according to claim 1, wherein each rotation sensor consists of a gyroscope.

12. The measuring device according to claim 1, wherein it comprises three translation sensors configured to measure three corresponding translations (XC, YC, ZC) of said supporting frame.

13. The measuring device according to claim 1, wherein said at least two translation sensors consist of an accelerometer.

14. The measuring device according to claim 1, wherein the supporting frame is provided with one or more protective shields that are configured to protrude from a corresponding outer lateral surface of said supporting frame by such a quantity that the profile measuring apparatuses remain inside the volume of each protective shield under a specific operating condition of said supporting frame.

15. A method for measuring an excavation site using a measuring device according to claim 1, the method comprising the steps of:
    inserting the measuring device into the excavation site;
    moving the measuring device in the excavation site;
    measuring, by means of the profile measuring apparatus, the distance (ΔP, ΔQ) of the lateral wall of the excavation site with respect to an outer lateral surface of the supporting frame of the measuring device;
    measuring, by means of the rotation sensors, the rotation angles (AX, AY, AZ) of the supporting frame with respect to the predefined absolute orthogonal reference system (X, Y, Z);
    measuring, by means of the translation sensors, the translations (XC, YC) of the supporting frame with respect to an axis of the absolute orthogonal reference system (X, Y, Z); and calculating the actual profile of the lateral wall of the excavation site through the data processing system and based on the data measured.

16. The method according to claim 15, wherein the step of measuring the distance (ΔP, ΔQ) of the lateral walls of the excavation site with respect to the outer lateral surface of the supporting frame of the measuring device is carried out by means of at least four profile measuring apparatuses arranged in pairs along two respective axes (P, Q) orthogonal to one another, in such a manner that the data processing system calculates both the actual profile and the actual three-dimensional shape of the excavation site at each depth of excavation site (ZC).

17. The method according to claim 15, wherein the measuring and calculating steps are carried out during the progressive rise of the measuring device inside the excavation site.

18. The method according to claim 17, wherein several measuring steps executed at progressive depths of excavation site (ZC) are carried out so that a rise stroke of the measuring device is executed at each measuring step, starting from an intermediate depth up to the intermediate starting depth of the preceding measuring step.

19. The method according to claim 15, wherein the measuring and calculating steps are carried out during the progressive descent of the measuring device inside the excavation site.

20. The method according to claim 19, wherein several measuring steps executed at progressive depths of excavation site (ZC) are carried out so that a descending stroke of the measuring device is executed at each measuring step, starting from an intermediate depth reached at the end of the preceding measuring step.

* * * * *